W. E. HOLLAND AND J. M. SKINNER.
STORAGE BATTERY GRID.
APPLICATION FILED OCT. 29, 1918.

1,387,397.

Patented Aug. 9, 1921.
3 SHEETS—SHEET 1.

Inventors;
Walter E. Holland,
James M. Skinner,
by their Attorneys.
Howson & Howson

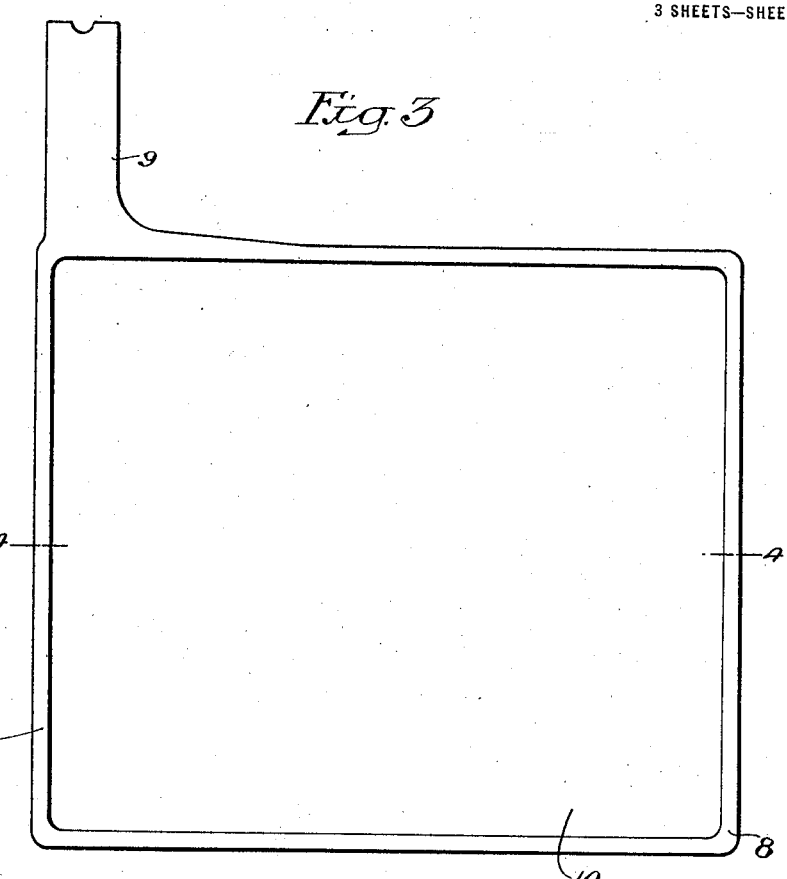
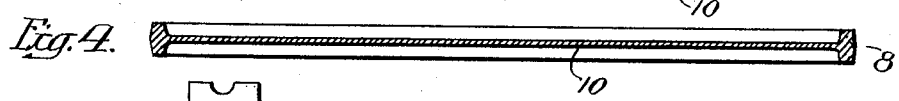
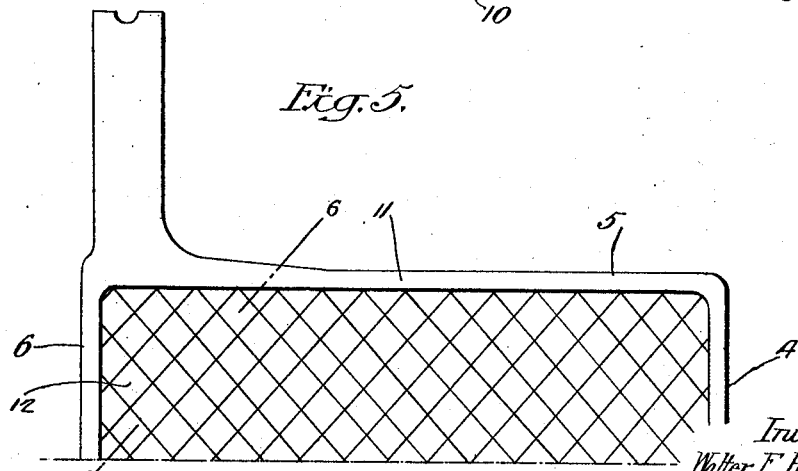

W. E. HOLLAND AND J. M. SKINNER.
STORAGE BATTERY GRID.
APPLICATION FILED OCT. 29, 1918.

1,387,397.

Patented Aug. 9, 1921.

Inventors,
Walter E. Holland,
James M. Skinner,
by their Attorneys.
Howson & Howson

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE-BATTERY GRID.

1,387,397.      Specification of Letters Patent.      Patented Aug. 9, 1921.

Application filed October 29, 1918. Serial No. 260,192.

*To all whom it may concern:*

Be it known that we, WALTER E. HOLLAND and JAMES M. SKINNER, citizens of the United States, residing in Philadelphia, Pennsylvania, have invented Storage-Battery Grids, of which the following is a specification.

The supporting frames or grids of storage battery electrodes or plates are customarily made by casting a suitable lead alloy in a metal mold maintained by gas burners at such a temperature as will insure the flow of metal to all of its parts. These burners are necessarily so operated as to maintain the mold temperature at such a point that the molten metal will certainly flow to the parts of the mold most remote from the pouring gate as well as fill the channels having the smallest cross sectional area. The resulting frames or grids, owing to conditions inherent in this method of manufacture, are of a non-uniform structure, are more or less porous, and vary in density and strength at different points. Because of this porous, non-uniform structure, the grids are attacked under conditions of use, the metal being oxidized not only on its outer surfaces but also internally, due to penetration of the electrolyte into the pores. As a consequence, in a relatively short time the integrity of the grid is seriously impaired and the useful life of the plate, of which the grid is the foundation, is shortened. Moreover, owing to the unequal stresses resulting from this internal oxidation of the porous, non-uniform metal, the grids and consequently the plates made from them are found to buckle or become otherwise distorted, causing the plates to short-circuit and become inoperative in a relatively short time.

One object of our invention therefore, is to provide a grid or frame for storage battery plates which shall be of relatively high density, practically free from pores, and of a uniform texture or structure throughout, with a view to preventing the internal oxidation, with the consequent disintegration, uneven action and buckling which has hitherto occurred to a greater or less degree in grids as at present made and used.

Another object of the invention is to provide grids for storage battery plates in which the metal required for strength and current carrying capacity, shall occupy a smaller volume, and in which grid therefore there will be more room for active material.

A further object of the invention is to provide a storage battery grid which, by virtue of being filled out sharply and smoothly all over, will take the active paste uniformly at all points, with the result that the faces of the finished plate are smooth and perfectly flat. Such a plate has the advantage that when assembled with the usual flat perforated or slotted rubber separators, the active material will be better held in place and the plate life lengthened due to the improved surface contact of plate and separators. Furthermore, due to the elimination of surface hollows, such a plate will obviously contain more active material for a given overall thickness.

These objects and other advantageous ends we attain as hereinafter set forth, reference being had to the accompanying drawings, in which, Figure 1 is an elevation of a cast blank from which a grid may be formed by compression, in accordance with one method of making a storage battery grid fulfilling the requirements of our invention. This figure also serves to show one form of finished grid in accordance with our invention;

Fig. 3 is an elevation of another form of cast blank from which a grid may be formed in accordance with our invention;

Fig. 4 is a cross section on the line 4—4, Fig. 3;

Fig. 5 is a fragmentary elevation of a finished plate;

Fig. 6 is a section on the line 6—6, Fig. 5;

Figure 1:
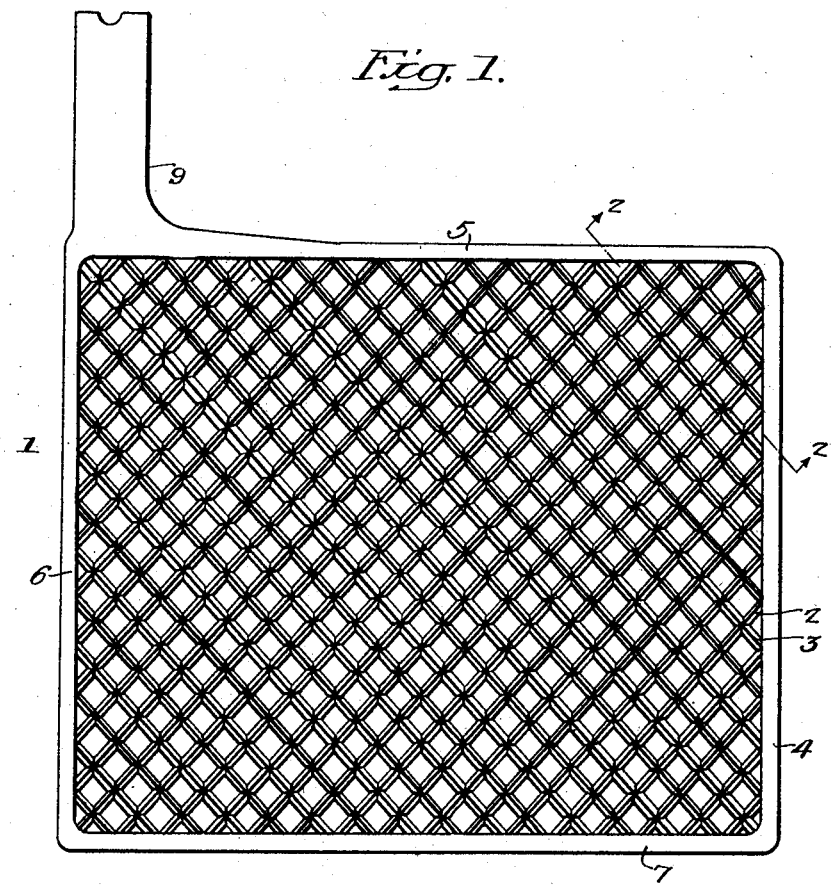
Figure 2:
Fig. 2 is a cross section on the line 2—2, Fig. 1.

By one method of making a storage battery grid or frame which shall fulfil the requirements of our invention, we cast a blank 1, such as that illustrated in Figs. 1 and 2, by any of the usual methods and which may be identical with battery grids as now cast. The casting is then placed between the suitably formed dies of a press wherein it is subjected to a relatively high pressure so that its various ribs 2—3 and frame members 4—7 are internally compacted and so far increased in density as to be practically without pores or other superficial or internal cavities. This method is described in detail and claimed in the application No. 260,193 dated October 29, 1918, of Messrs. Holland and Skinner, which also describes and claims a variation on the above method in which a grid is formed by compression or coining from a cast blank such as shown in Figs. 3 and 4.

Owing to the nature of the metal used and especially to the fact that it will flow and weld under pressure, the structure of the grid is rendered uniformly dense at all points so that when it is incorporated in a storage battery plate and subjected to conditions of use, the electrolyte cannot penetrate into its body and the oxidation proceeds evenly, on the surface of the metal only. As a result, the grid retains its strength and conductivity, has a longer useful life, and is not subjected to internal stresses.

In the case illustrated in Figs. 3 and 4 the blank employed is cast and consists of a rectangular marginal frame 8 having a projecting lug 9 at one end and formed with a relatively thin web 10 containing sufficient material to provide the ribs of the grid.

Such a blank is subjected to a relatively high pressure between suitable dies, preferably heated, whereby the various rib and frame members 2—7, Fig. 1, are struck up or coined from the body or web 10. Thereafter the thin fins or webs of metal remaining between the formed members are removed by cutting, punching or otherwise as described and claimed in the application above referred to. In this case also, owing to the compacting and welding of the metal under pressure, the structure of the grid is rendered dense, non-porous and uniform in texture.

Figure 7:
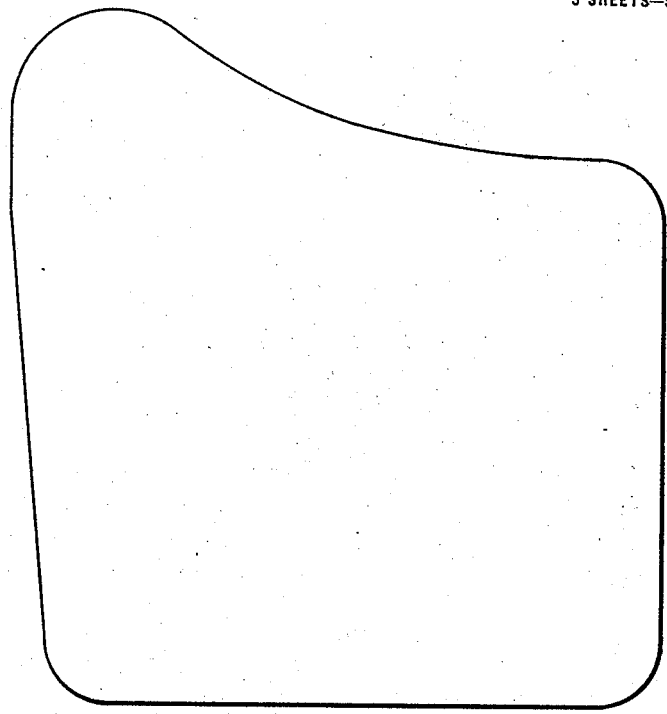
Fig. 7 is an elevation of a blank of sheet metal of uniform thickness.
Figure 8:
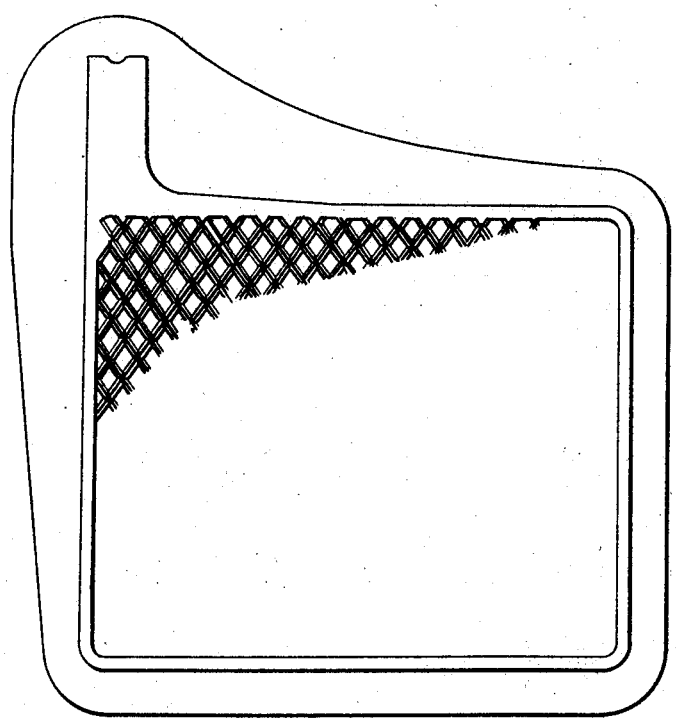
Fig. 8 is an elevation after striking up or coining the members of a grid from the blank shown in Fig. 7.
Figure 9:
Fig. 9 is an edge view of the structure shown in Fig. 8.

Another method of making the grid constituting our invention is to subject a flat blank of rolled sheet metal of uniform thickness, as shown in Fig. 7, to a relatively high pressure between suitable dies, preferably heated, whereby the rib and frame members are struck up or coined, as shown in Figs. 8 and 9. Thereafter the thin fins or webs of metal remaining between the members as well as those projecting around the outside of the frame or marginal members, may be removed by cutting, punching, or any other suitable means, as described and claimed in the application of Messrs. Holland and Skinner referred to above.

In any case, the grids constituting our invention have a close, compact and homogeneous structure or texture, uniformly strong and practically free from pores, by virtue of which they are correspondingly free from internal oxidation and consequent distortive stresses and disintegrating action, under conditions of use. As a consequence the plates embodying such grids have a materially longer useful life than has hitherto been obtainable. Furthermore, the grids constituting our invention are filled out sharply and smoothly and the amount of metal required, owing to mechanical and electrical considerations, occupies less space, so that the finished plates 11, Figs. 5 and 6, embodying such grids are not only smooth and of uniform thickness at all points but contain more active material 12 for any given overall dimensions.

We claim:

1. As a new article of manufacture a storage battery grid consisting of a relatively dense, homogeneous body of metal.

2. As a new article of manufacture a storage battery grid consisting of a frame and a series of ribs connecting the elements of said frame, the ribs and frame being composed of relatively compressed, uniformly dense, metal.

3. As a new article of manufacture a storage battery grid consisting of a relatively dense, homogeneous body of an alloy of lead.

4. As a new article of manufacture a storage battery grid consisting of relatively densified alloy of lead.

5. As a new article of manufacture a storage battery grid consisting of a frame and a series of ribs connecting the elements of said frame, the ribs and frame being composed of a relatively densified alloy of lead.

6. As a new article of manufacture a storage battery plate consisting of a relatively dense homogeneous body of relatively densified metal and active material carried by said grid.

7. As a new article of manufacture a storage battery plate consisting of a frame and a series of ribs connecting the elements of said frame, all of relatively densified metal; with active material carried by said grid.

In witness whereof we affix our signatures.

WALTER E. HOLLAND.
JAMES M. SKINNER.